United States Patent [19]

May

[11] 3,924,411
[45] Dec. 9, 1975

[54] OIL-SUPPLY MEANS FOR RUNNER HUBS WITH CONTROLLABLE PITCH BLADES

[75] Inventor: Eric R. May, Kent, England

[73] Assignee: Stone Manganese Marine Limited, London, England

[22] Filed: Mar. 21, 1973

[21] Appl. No.: 343,311

[52] U.S. Cl. .................. 60/486; 74/802; 416/157
[51] Int. Cl.² ........................................ F16D 31/00
[58] Field of Search .................. 417/231, 233, 374; 416/156, 157, 158; 115/34 R, 34 A; 74/802; 60/486, 698

[56] References Cited
UNITED STATES PATENTS

| | | | |
|---|---|---|---|
| 1,182,536 | 5/1916 | Dunn | 417/233 |
| 1,329,137 | 1/1920 | Oldham | 417/374 |
| 1,957,183 | 5/1934 | Schmitthenner | 416/157 |
| 2,812,026 | 11/1957 | Braddon | 416/157 X |
| 2,850,103 | 9/1958 | Pearl | 416/157 |
| 2,902,205 | 9/1959 | Parker | 417/374 X |

Primary Examiner—Irwin C. Cohen
Assistant Examiner—Edward Look
Attorney, Agent, or Firm—Fred Philpitt

[57] ABSTRACT

A pump driving arrangement for supplying hydraulic fluid under pressure from a pump to a servomotor in which the pump is rotatable about the axis of a rotary member and is driven by a transmission provided on a relatively stationary means. The transmission may include gearing or similar power transmitting means and may be selectively rotatable or lockable with respect to the relatively stationary means and the transmission may also include a motor connected thereto by gearing, or a driving belt or chain. Means may also be provided to drive the pump when the speed of the rotary member is below a predetermined value.

6 Claims, 5 Drawing Figures

SERVOMOTOR

OIL-SUPPLY MEANS FOR RUNNER HUBS WITH CONTROLLABLE PITCH BLADES

This invention relates to arrangements for supplying hydraulic fluid under pressure to servo-motors which actuate selected components and is particularly but not exclusively concerned with oil-supply means for runner hubs for example in ships' propellers, turbines or pumps having controllable pitch blades, the adjustment of blade pitch being obtained by servomotors arranged either in the hub or the associated shafting and in which the pump or pumps rotate with the shafting.

In known arrangements the high pressure oil supply required to operate the servomotors may be provided by one or more pumps secured to a stationary location such as the structure of a ship or from a pump arrangement located within the shafting and driven for example by electric motors. In the case of non-rotating pumps oil must be supplied to the rotating hub or shafting from a non-rotating oil transfer box but where the shafting is rotating, such an arrangement gives rise to problems with respect to high-pressure seals against leakage and to seal operating temperatures. The second arrangement referred to above leads to problems associated with accessibility of the pumps and with the supply of electrical power to the rotating shafting and to the pump driving motors, and the present invention seeks to avoid or minimise these difficulties.

According to one aspect of the invention there is provided a pump driving arrangement for supplying hydraulic fluid under pressure from at least one pump to a servomotor in a hydraulic circuit wherein each pump is mounted externally of and for rotation with a rotatable member about the axis thereof and each pump is driven by a transmission means provided on a relatively stationary means.

According to another aspect of the invention there is provided a pump driving arrangement for supplying hydraulic fluid under pressure from at least one pump to a servomotor in a hydraulic circuit including fluid transfer means wherein each pump is arranged externally of and for rotation with a rotatable shaft, the fluid transfer means being relatively stationary, a pump drive means for each pump being associated with the fluid transfer means and supported so as to be relatively stationary with respect to the shaft, and auxiliary pump driving means are provided operable when the shaft is rotating below a predetermined speed.

In a further aspect of the invention, the fluid transfer means supplies hydraulic fluid to each pump and low pressure sealing means are provided between the rotatable member and the fluid transfer means, while in yet another aspect of the invention the transmission comprises a gear provided on each pump and a driving gear mounted concentrically with the fluid transfer means.

It will be evident that in this invention a number of pumps supplying high-pressure oil to each servomotor can be supported on and rotate with a shaft, while each pump has a driven shaft driven by a transmission, which may be a gear train or a driving belt or chain provided in association with the oil transfer box. The pump drive may be lockable to the transfer box or it may be selectively rotatable in relation to the transfer box by means of a motor mounted on a non-rotating part of the installation.

High pressure oil is thus fed to a servomotor which can adjust the pitch of a propellor or turbine blade on a runner or hub by means of a relatively non-rotatable oil transfer box mounted on the main driving shaft or one extension thereof, low pressure oil from the transfer box being led to one or more high-pressure pumps mounted on and rotating with the shaft. Such an arrangement obviates the need for rotating seals subject to oil pressure at any point in the hdyraulic circuit except for seals between the transfer box and the shafting on which it is supported, these seals being subject to only relatively low hydraulic pressure and those seals which are integral parts of their associated pumps.

The pump drive means may consist of a ring gear mounted in the oil transfer box, the ring gear being either secured to the transfer box or capable of relative rotation with respect to the box, this rotation being achieved by a motor and a drive train such as gearing or an endless belt or chain the motor being supported on a fixed part of the system.

Where the ring gear is rotatable, it may be prevented from rotation when desired by providing a brake means which may act on the motor. Alternatively a non-reversible ratchet or worm-drive may be employed and the control gear for the braking or locking means and the drive motor may be operated manually or automatically in response to selected parameters.

Rotation of the drive means may be effected by connecting the drive to a non-rotating part of the structure, this connection being either rigid or flexible.

Embodiments of the invention will now be described by way of example and with reference to the accompanying drawings, in which.

In these embodiments, which relate to a controllable pitch ship's propeller, a known type of runner hub contains a hydraulic servomotor to which high-pressure fluid must be supplied to either side of the servomotor piston to turn the blades of the hub and inessential parts have been omitted for clarity.

Figures 1, 4:
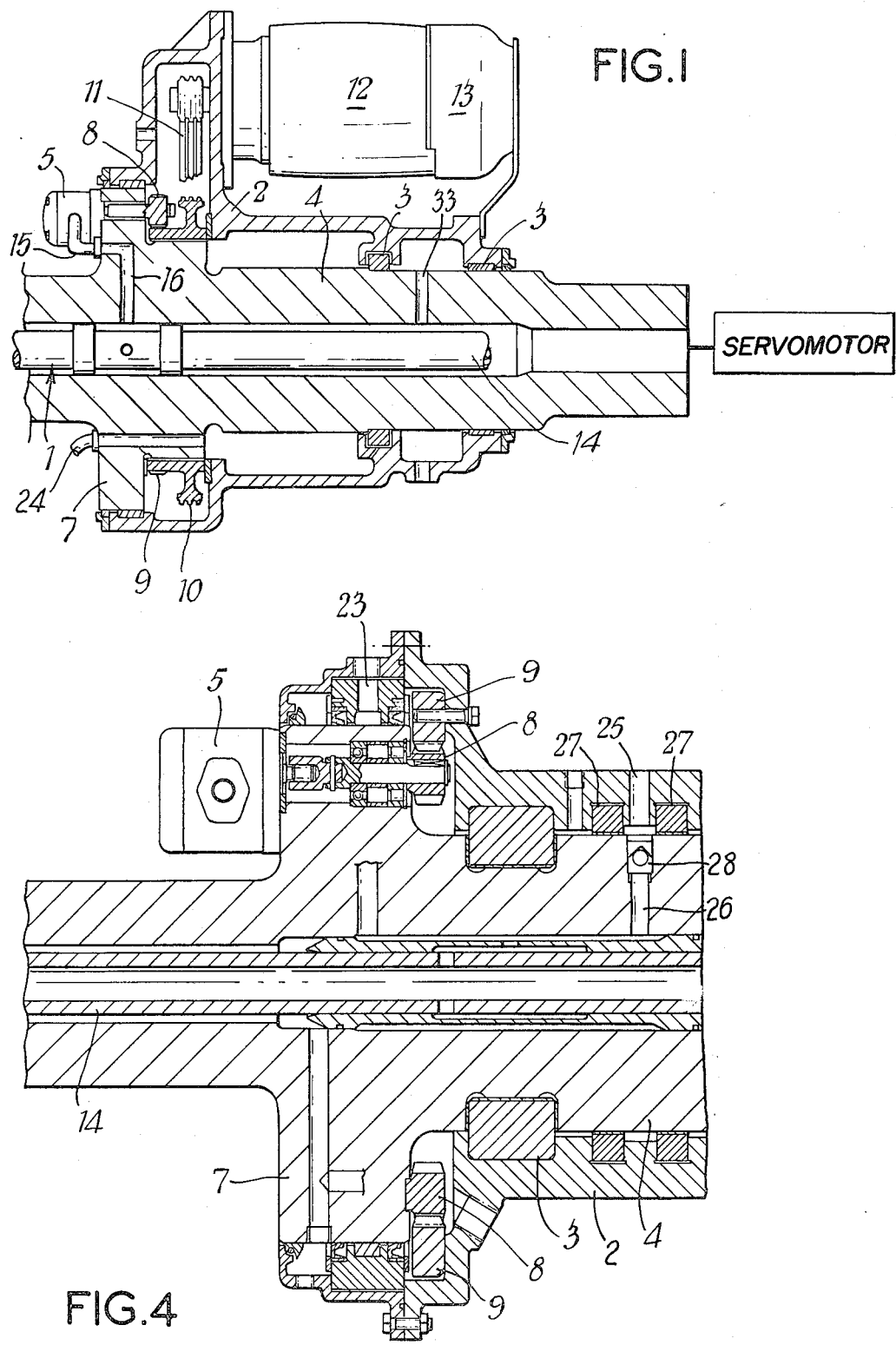
FIg. 1 is a longitudinal sectional view illustrating one embodiment of this invention.
FIGS. 4 and 5 are a longitudinal section and an end elevation respectively of a third embodiment illustrating the pump driving means, FIG. 4 being a longitudinal section taken along the line IV—IV of FIG. 5.

As shown in FIG. 1, the oil transfer box which consists essentially of a large-diameter housing or casing 2 is supported by bearings 3 on a shaft 4, the housing 2 being prevented from rotating by being connected to a fixed part of the ship's structure. The transfer box serves to introduce oil into the shaft, return oil from the hub to a main oil tank and provide for control of the servomotor by transmitting command and feed-back signals to or from components in the main shaft installation. The valve 1 may be located in the transfer box shaft 4 as shown and is provided with oil at high-pressure by two pumps 5 which are mounted on a flange 7, integral with or secured to the transfer box shaft 4, the shaft 4 being an intermediate shaft between the ships power plant and its propeller. Alternatively the valve 1 may be located in the runner hub. A similar arrangement is equally applicable to a turbine or pump.

The pumps 5, only one of which is shown in FIG. 1, are driven by gears 8 meshing with a gear ring 9, the pumps being diametrically opposite to one another.

The gear ring 9 is mounted on a wheel 10 coupled by means of an endless belt or chain 11 to a driving motor 12 mounted on the casing 2. An electro-magnetic brake 13 is provided on the motor shaft as shown.

When the shaft 4 is stationary or turning very slowly, hydraulic pressure is low and so the brake 13 is released and the motor 12 is caused to rotate. Consequent rotation of the gear ring 9 drives the pumps 5 so that oil under sufficiently high pressure can be fed to the valve 1.

When the shaft turns more quickly or accelerates the pumps also run faster and at a predetermined shaft speed the motor 12 is stopped, for example, automatically, and the brake 13 is operated to stop rotation of the gear ring 9. As the pumps are rotating with the shaft 4 they continue to be driven as their pinions 8 roll round the gear ring 9 and conversely the motor 12 will be energised when the shaft speed falls below a predetermined value.

The pump output is delivered by the pumps to the oil transfer tube 14 in the shafting through a pipe 15 and a duct 16 in the shaft 4, the tube 14 is rotatable with the shafting and displaceable axially within the shafting when blade pitch is altered since this tube 14 passes through the hollow bore of the shafting and is connected to axially movable parts of the servomotor.

Supply and return oil connections lead between the transfer box and an oil tank and oil is supplied to the housing 2 and thence to the pumps 5 through a passage in the shaft flange 7 and pipes 24. Oil is returned at low pressure through a duct 33 in the shaft 4 to the transfer box.

Figure 2:
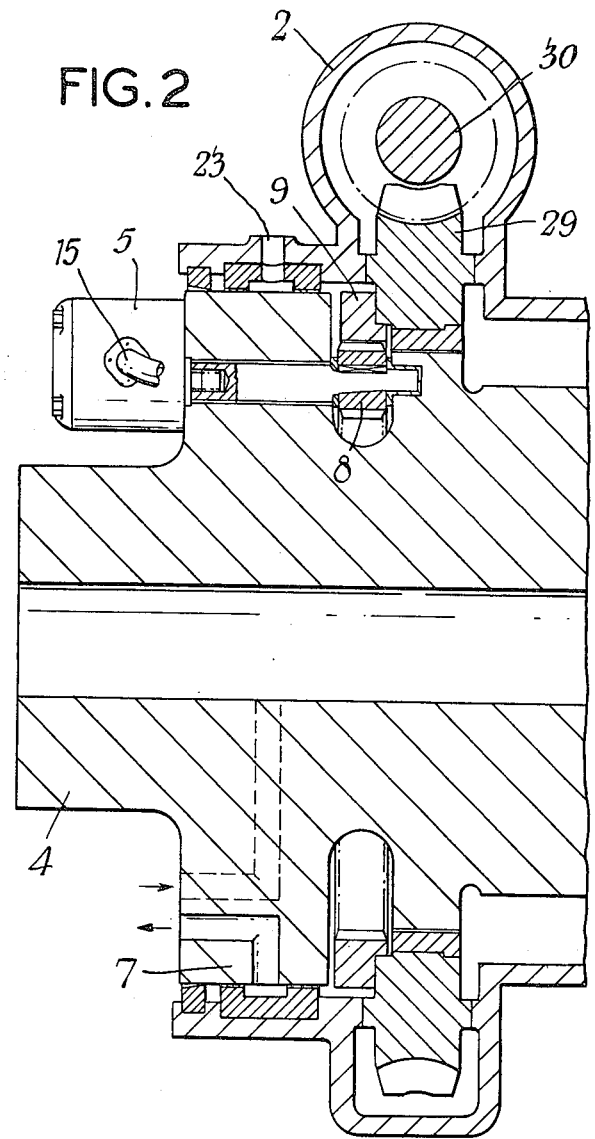
FIG. 2 is a longitudinal section view illustrating a second embodiment of the invention taken on the line II—II of FIG. 3.
Figure 3:
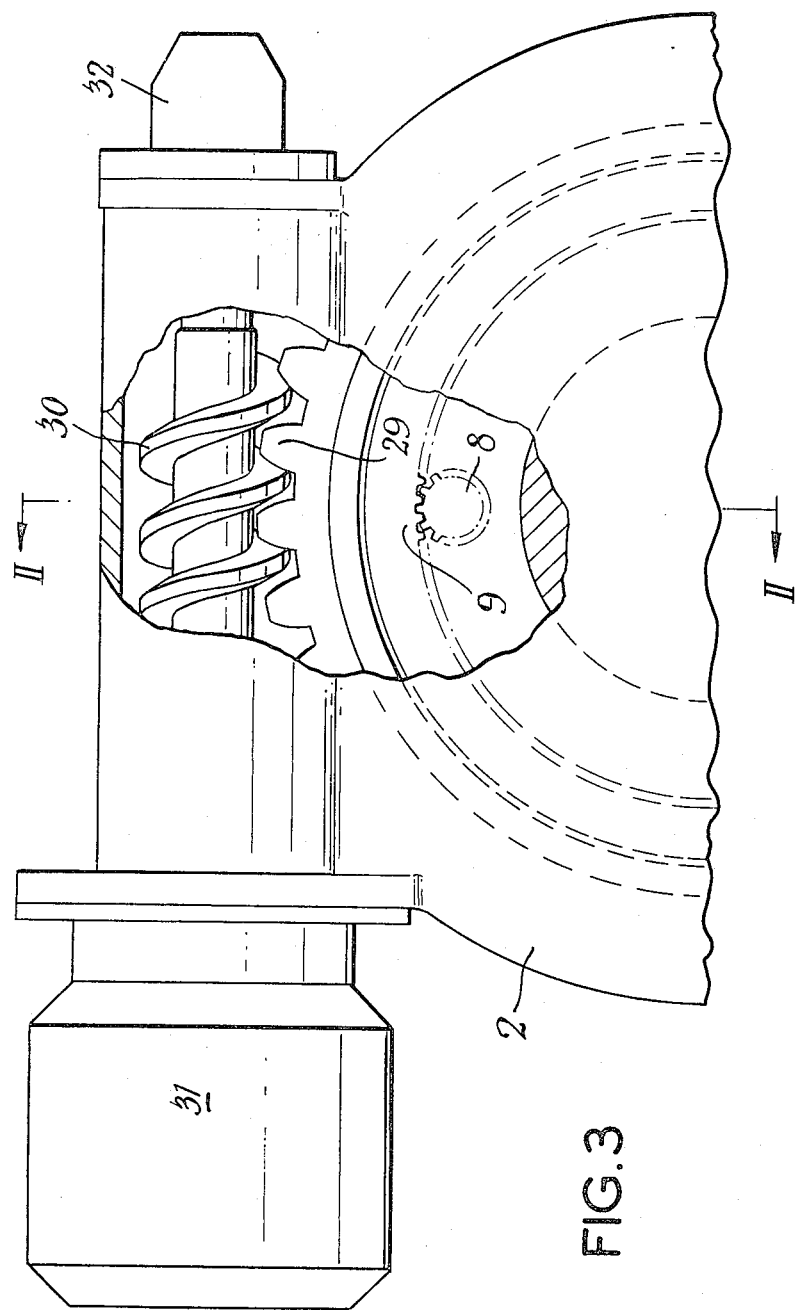
FIG. 3 is an end elevation of the embodiment shown in FIG. 2 with part of the housing cut away.

In the embodiment shown in FIGS. 2 and 3, a ring gear 9 is secured to a worm wheel 29, pinions 8 on each pump engaging the ring gear as in the case of the embodiments described above. During rotation of the shaft 4 above a predetermined minimum, the pumps revolve with the shaft 4 and are driven as has been described. At speeds below this minimum or when the shaft is stopped, the wormwheel 29 is rotated about its axis by means of a wormshaft 30 rotated by an electric motor 31. The rotation of the worm shaft and worm wheel is confined to a single direction by means of the device 32 which may for example be a non-reversible clutch or ratchet mechanism. At low shaft speeds or when the shaft 4 is stationary, the motor 31 is energised and drives the wormshaft and wormwheel so that the pumps are driven, the device 32 being free to rotate in the same direction. The pumps will run faster as the shaft speed rises and at a predetermined shaft speed the motor 31 is switched off and the device 32 locks the wormshaft 30 and the wormwheel 29 so that the pumps 5 and 6 continue to be drive by their pinions 8 as they rotate round the ring gear 9.

Figure 5:
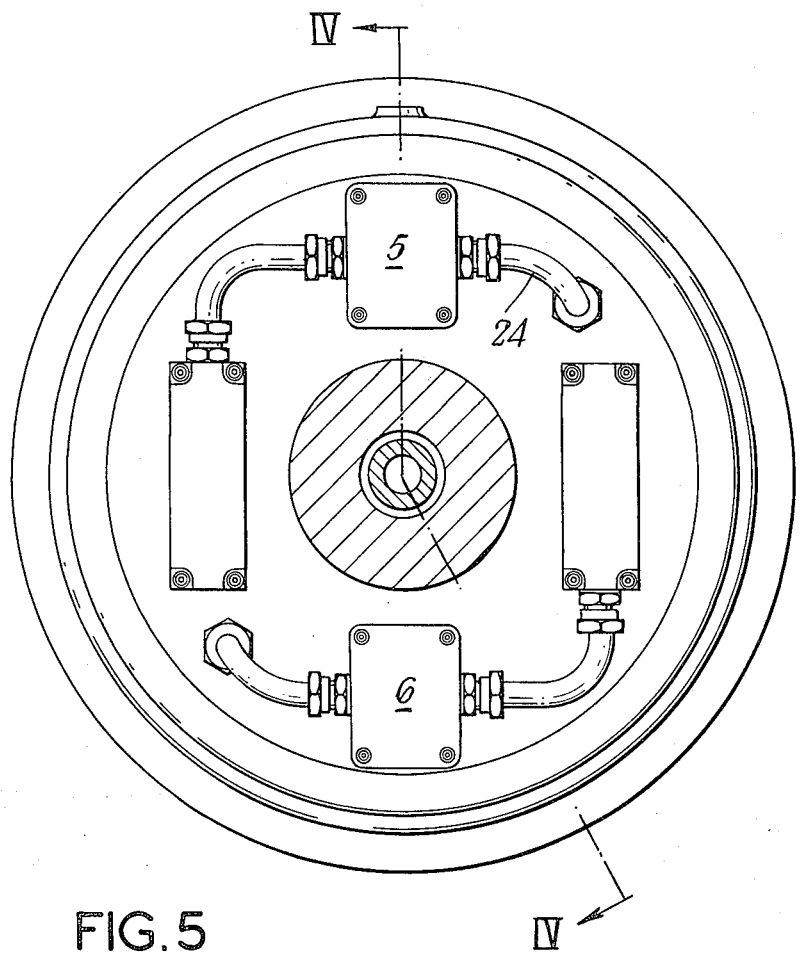

In the embodiment shown in FIGS. 4 and 5, the control valve controlling the flow of high-pressure oil to the servomotor may be disposed in the shaft in the region of the oil transfer box or in the region of the runner and the control valves connected to the oil transfer tube 14 which controls the axial position of the valve and supplies high pressure oil thereto.

The oil transfer box includes the large diameter housing or casing 2 which surrounds and is supported on the shaft 4 by bearings 3 and in the case of a ship's propulsion system the casing 2 is prevented from rotating by being flexibly or rigidly linked to the structure of the ship. The transfer box delivers oil into the shaft, returns oil from the hub to a tank and controls the servomotor by transmitting command and feedback signals to and form components in the main shafting installations.

The oil transfer tubing 14 receives high-pressure oil from the gear-driven pumps 5 and 6 mounted on a flange 7 integral with or secured to the shaft 4 which in an intermediate shaft between a prime mover and the blade runner or hub. The pumps 5 and 6 are diametrically opposite each other and each is driven by a pinion gear 8 running in mesh with a ring gear 9 bolted to the casing 2.

Oil is fed to the pumps 5 and 6 through the passage 23 in the casing and thence through further passages in the flange 7 to the pipes 24 and thus to the pumps.

As the ring gear 9 is held against rotation by being bolted to the casing 2, when the shaft is stationary or rotating slowly, insufficient pressure is generated by the pumps 5 and 6 so that an auxiliary pump (not shown) must be provided to supply sufficient hydraulic pressure to operate the servomotor. As the shaft accelerates the pumps 5 and 6 will run faster and at a predetermined shaft speed the auxiliary pump is stopped and as the pumps 5 and 6 continue to be driven as their pinions 8 mesh with the stationary ring gear 9 oil at high pressure is fed to the servomotor. When the shaft slows down below a predetermined speed the auxiliary pump can be re-started.

Oil from the auxiliary pump is supplied to the shaft bore by passages 25 in the casing 2 and passages 26 in the shaft 4 and pressure seals 27 prevent leakage. A non-return valve 28 is provided by means of which oil at full pressure is prevented from reaching the seals 27 which may be of conventional medium-pressure design.

I claim:

1. An apparatus for supplying pressurized hydraulic fluid to the interior of a rotating shaft, comprising in combination:
   a. a rotatable shaft having an interior fluid passageway, an inlet fluid duct connecting the exterior of said shaft with said interior fluid passageway, and a servomotor means connected to said passageway,
   b. at least two pumps for pumping hydraulic fluid through said inlet duct,
   c. each pump being mounted on an external portion of said rotary shaft so that when the rotary shaft rotates each pump will rotate with it,
   d. each pump being driven by the engagement of a first gear means, which is integrally connected with the pump, with a second gear means, which is mounted concentrically and separately with respect to said rotatable shaft,
   e. said second gear means being interconnected to a drive means which is adapted to rotate said second gear means around said rotary shaft when the speed of rotation of said rotary shaft drops below a predetermined value, and
   f. braking means interconnected to said drive means to prevent rotation of said second gear means when operative and to permit rotation of said second gear means when inoperative, whereby, when said rotary shaft is rotating above said predetermined rotary speed each pump will be driven by the intermeshing of said first gear means with the braked non-rotating second gear means and when said rotary shaft rotates below said predetermined rotary speed then each pump will be driven by the intermeshing of said first gear means with the unbraked rotating second gear means.

2. An apparatus according to claim 1 wherein the drive means in (e) is a selectively operable drive motor.

3. An apparatus according to claim 2 wherein said drive motor is connected to said second gear means by a third gear means.

4. An apparatus according to claim 2 wherein said drive motor is connected to said second gear means of a belt.

5. An apparatus according to claim 1 wherein said second gear means is a ring gear.

6. An apparatus according to claim 1 wherein said first and second gear means is mounted within a housing that is located annularly with respect to the rotary shaft and which does not rotate with the rotary shaft.

* * * * *